UNITED STATES PATENT OFFICE.

DAVID BELL, OF TORONTO, ONTARIO, CANADA.

PAINT.

SPECIFICATION forming part of Letters Patent No. 397,105, dated February 5, 1889.

Application filed November 24, 1888. Serial No. 291,308. (No specimens.)

*To all whom it may concern:*

Be it known that I, DAVID BELL, a citizen of Canada, residing at Toronto, in the county of York and Province of Ontario, Canada, have invented certain new and useful Improvements in Paint Compounds; and I do hereby declare the following to be a full, clear, and exact description of the invention, such as will enable others skilled in the art to which it appertains to make and use the same.

This invention relates to a certain novel combination of ingredients for paint designed to protect wood and metal from decay and the action of the weather, and at the same time producing a composition which is fire-proof, all of which is composed of the following ingredients, to wit: Proportions, by measure, petroleum-tar, seventy per cent.; crude petroleum, ten per cent.; linseed-oil, (boiled,) four per cent.; mineral paint, five per cent.; sodium chloride, five per cent.; rubber, two per cent.; lamp-black, two per cent.; glue, two per cent.

Mode of preparation: Take petroleum-tar, crude petroleum, and boiled linseed-oil together and place in a vessel and heat the same until boiling; then add the other ingredients above mentioned and stir or agitate the whole until the ingredients are thoroughly mixed. The same is then used in a heated state, applied with a brush in the common manner.

When this composition is set or cold it has the appearance of slate, and renders that which is painted fire-proof, as well as keeping out dampness, thus presenting an excellent preserver.

What I claim is—

The herein-described composition for paint, composed of the following combination of ingredients: petroleum-tar, crude petroleum, boiled linseed-oil, mineral paint, sodium chloride, rubber, lamp-black, and glue, in or about proportions specified.

In testimony whereof I affix my signature in presence of two witnesses.

DAVID BELL.

Witnesses:
J. H. SUTHERLAND.
CHAS. PENDRICH.